United States Patent
Ferretti et al.

(10) Patent No.: US 9,802,521 B2
(45) Date of Patent: Oct. 31, 2017

(54) MULTILAYER SEAT

(71) Applicant: FORD GLOBAL TECHNOLOGIES, LLC, Dearborn, MI (US)

(72) Inventors: Daniel Ferretti, Commerce Township, MI (US); Johnathan Andrew Line, Northville, MI (US); Marcos Silva Kondrad, Macomb Township, MI (US); John W. Jaranson, Dearborn, MI (US)

(73) Assignee: FORD GLOBAL TECHNOLOGIES, LLP, Dearborn, MI (US)

( * ) Notice: Subject to any disclaimer, the term of this patent is extended or adjusted under 35 U.S.C. 154(b) by 10 days.

(21) Appl. No.: 14/674,469

(22) Filed: Mar. 31, 2015

(65) Prior Publication Data

US 2016/0288681 A1   Oct. 6, 2016

(51) Int. Cl.
| | |
|---|---|
| *B60N 2/70* | (2006.01) |
| *B60N 2/64* | (2006.01) |
| *B60N 2/68* | (2006.01) |
| *B60N 2/58* | (2006.01) |
| *B60N 2/66* | (2006.01) |
| *B60N 2/44* | (2006.01) |
| *B60N 2/72* | (2006.01) |
| *B60N 2/02* | (2006.01) |

(52) U.S. Cl.
CPC .............. *B60N 2/64* (2013.01); *B60N 2/4415* (2013.01); *B60N 2/58* (2013.01); *B60N 2/665* (2015.04); *B60N 2/68* (2013.01); *B60N 2/7094* (2013.01); *B60N 2/72* (2013.01); *B60N 2002/026* (2013.01)

(58) Field of Classification Search
CPC ........................................................ B60N 2/70
USPC ..................................................... 297/452.52
See application file for complete search history.

(56) References Cited

U.S. PATENT DOCUMENTS

| | | | | |
|---|---|---|---|---|
| 4,147,336 A | * | 4/1979 | Yamawaki | B60N 2/7041 267/111 |
| 4,324,431 A | | 4/1982 | Murphy et al. | |
| 4,629,248 A | | 12/1986 | Mawbey | |
| 5,044,693 A | * | 9/1991 | Yokota | B60N 2/66 297/284.4 |
| 5,423,593 A | * | 6/1995 | Nagashima | B60N 2/6673 297/284.4 |
| 5,658,050 A | | 8/1997 | Lorbiecki | |
| 5,692,802 A | | 12/1997 | Aufrere et al. | |
| 5,758,924 A | | 6/1998 | Vishey | |

(Continued)

FOREIGN PATENT DOCUMENTS

| | | |
|---|---|---|
| DE | 10 2006 061 226 | 6/2008 |
| DE | 10 2012 006 074 | 11/2012 |

(Continued)

*Primary Examiner* — Timothy J Brindley
(74) *Attorney, Agent, or Firm* — Vichit Chea; Price Heneveld LLP

(57) ABSTRACT

A vehicle seat includes a lower seating structure and a raised seatback support, wherein one of either the lower seating structure or raised seatback support consists of a multilayer assembly. The multilayer assembly includes a flexible static layer, a flexible dynamic layer having an adjustable firmness, a suspension layer formed from tunable springs which support a flexible panel, and a frame supported carrier including a protective recess within which the suspension layer is cradled.

19 Claims, 9 Drawing Sheets

(56) References Cited

U.S. PATENT DOCUMENTS

| | | | | |
|---|---|---|---|---|
| 5,810,392 A * | 9/1998 | Gagnon | ............... | B60N 2/002 180/268 |
| 6,079,781 A | 6/2000 | Tilley | | |
| 6,199,252 B1 * | 3/2001 | Masters | ............... | B60N 2/0224 29/469 |
| 6,412,874 B1 * | 7/2002 | Mayer | ............... | B60N 2/002 297/452.18 |
| 6,755,476 B2 * | 6/2004 | Kawashima | ............. | B60N 2/72 297/284.4 |
| 6,929,324 B2 * | 8/2005 | Enomoto | ............... | B60N 2/002 177/144 |
| 7,131,513 B2 * | 11/2006 | Mutou | ............... | B60N 2/002 180/273 |
| 7,252,341 B2 * | 8/2007 | Kircher | ............... | B60N 2/449 297/452.24 |
| 7,413,248 B2 * | 8/2008 | Matsuhashi | ............. | B60N 2/70 297/217.3 |
| 7,575,278 B2 * | 8/2009 | Wissner | ............... | B60N 2/66 297/284.2 |
| 7,731,294 B2 * | 6/2010 | Yasuda | ............... | B60N 2/58 297/452.13 |
| 7,966,835 B2 | 6/2011 | Petrovski | | |
| 8,231,174 B2 * | 7/2012 | Yamada | ............... | B60N 2/20 297/284.11 |
| 8,516,842 B2 | 8/2013 | Petrovski | | |
| 8,590,979 B2 * | 11/2013 | Matsumoto | ............ | B60N 2/4228 297/216.13 |
| 8,840,178 B2 * | 9/2014 | Mitsuoka | ............... | B60N 2/20 297/216.13 |
| 8,955,907 B2 * | 2/2015 | Adachi | ............... | B60N 2/4228 297/216.13 |
| 9,010,855 B2 * | 4/2015 | Yamaki | ............... | B60N 2/0232 297/216.13 |
| 9,114,743 B2 * | 8/2015 | Komamura | ............ | B60N 2/4221 |
| 9,126,508 B2 * | 9/2015 | Line | ............... | B60N 2/2222 |
| 2007/0200398 A1 | 8/2007 | Wolas et al. | | |
| 2013/0285426 A1 | 10/2013 | Arant et al. | | |
| 2014/0203606 A1 | 7/2014 | Line et al. | | |

FOREIGN PATENT DOCUMENTS

| | | |
|---|---|---|
| EP | 0 670 240 | 2/1995 |
| JP | 2011-251573 | 12/2011 |
| KR | 10-2008-0066428 | 7/2008 |
| KR | 10 2011 0051692 | 5/2011 |
| KR | 10-1180702 | 9/2012 |
| WO | 2010096307 | 8/2010 |

* cited by examiner

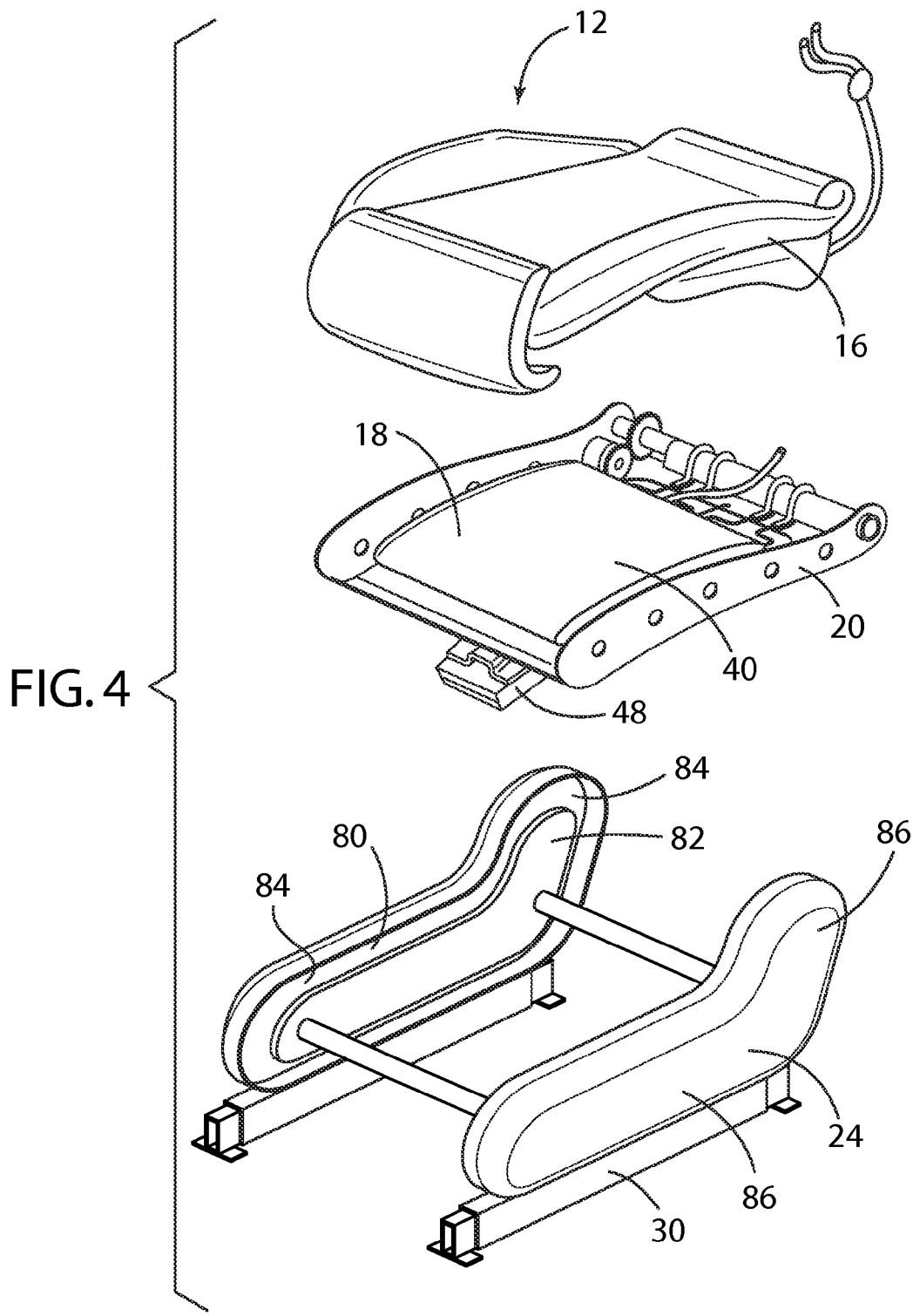

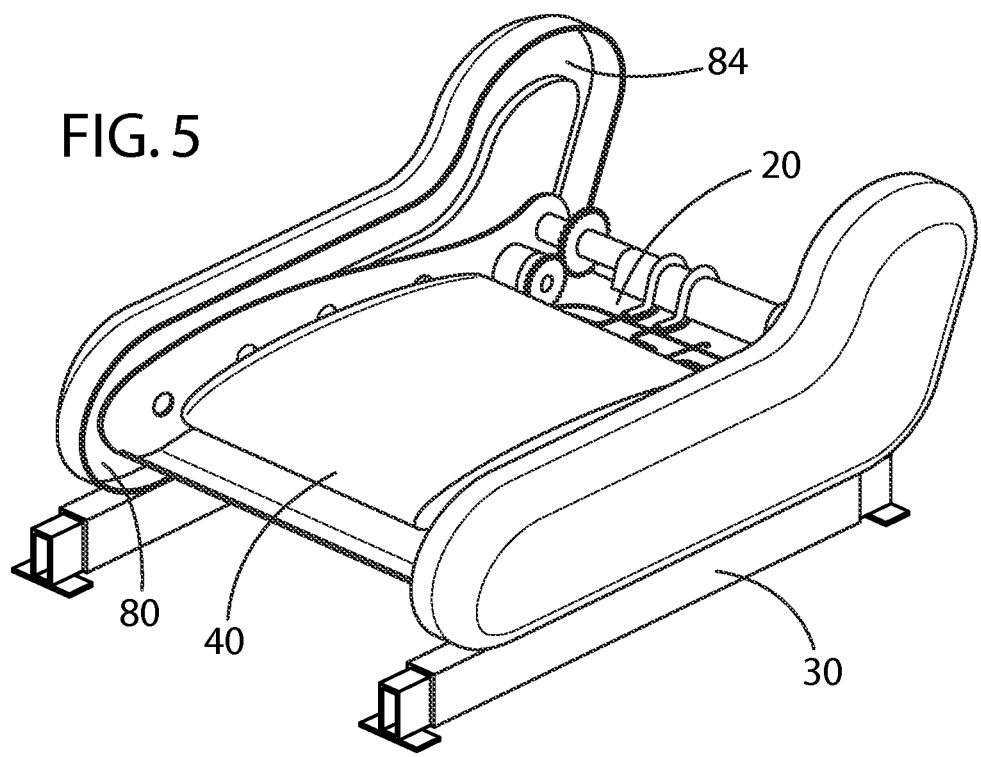

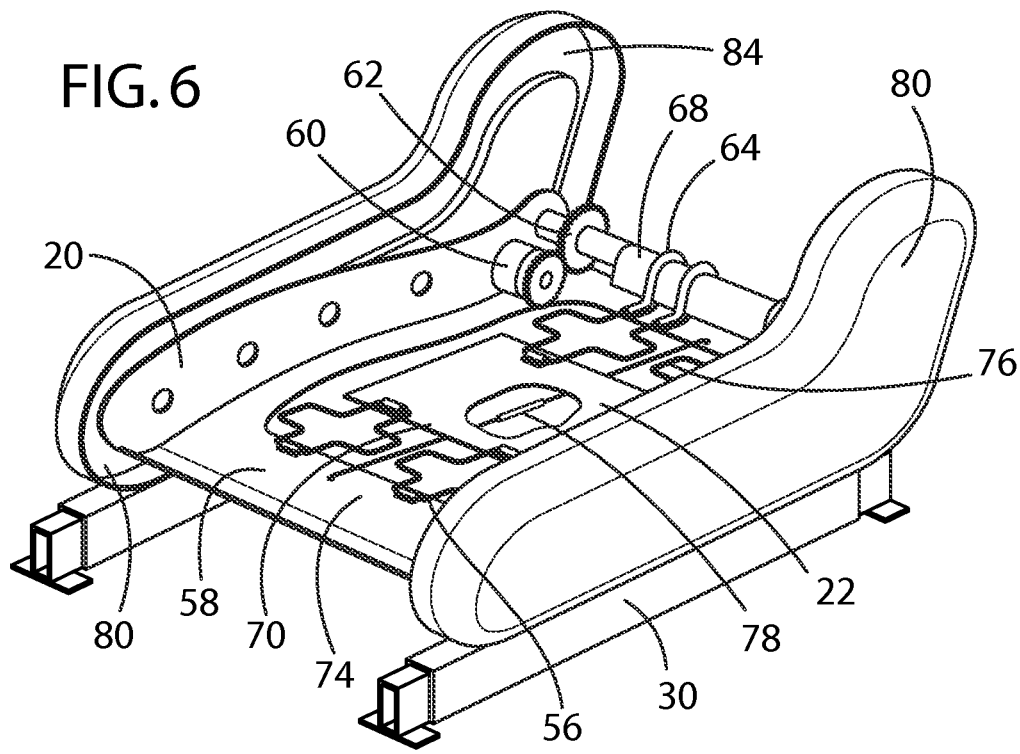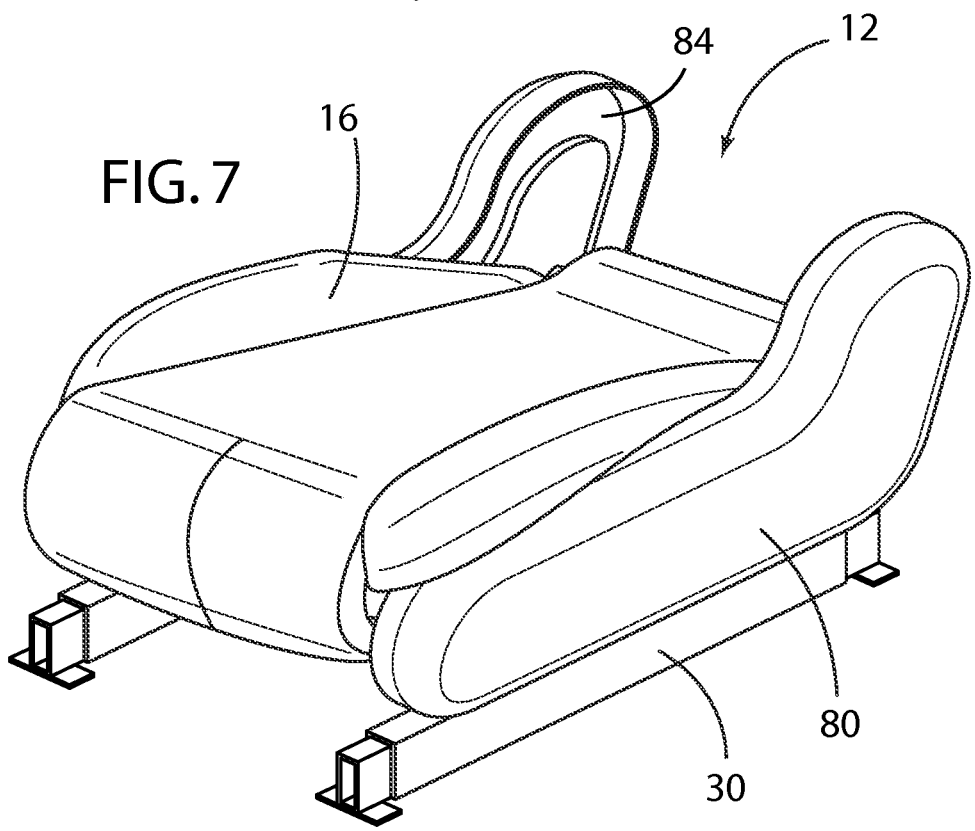

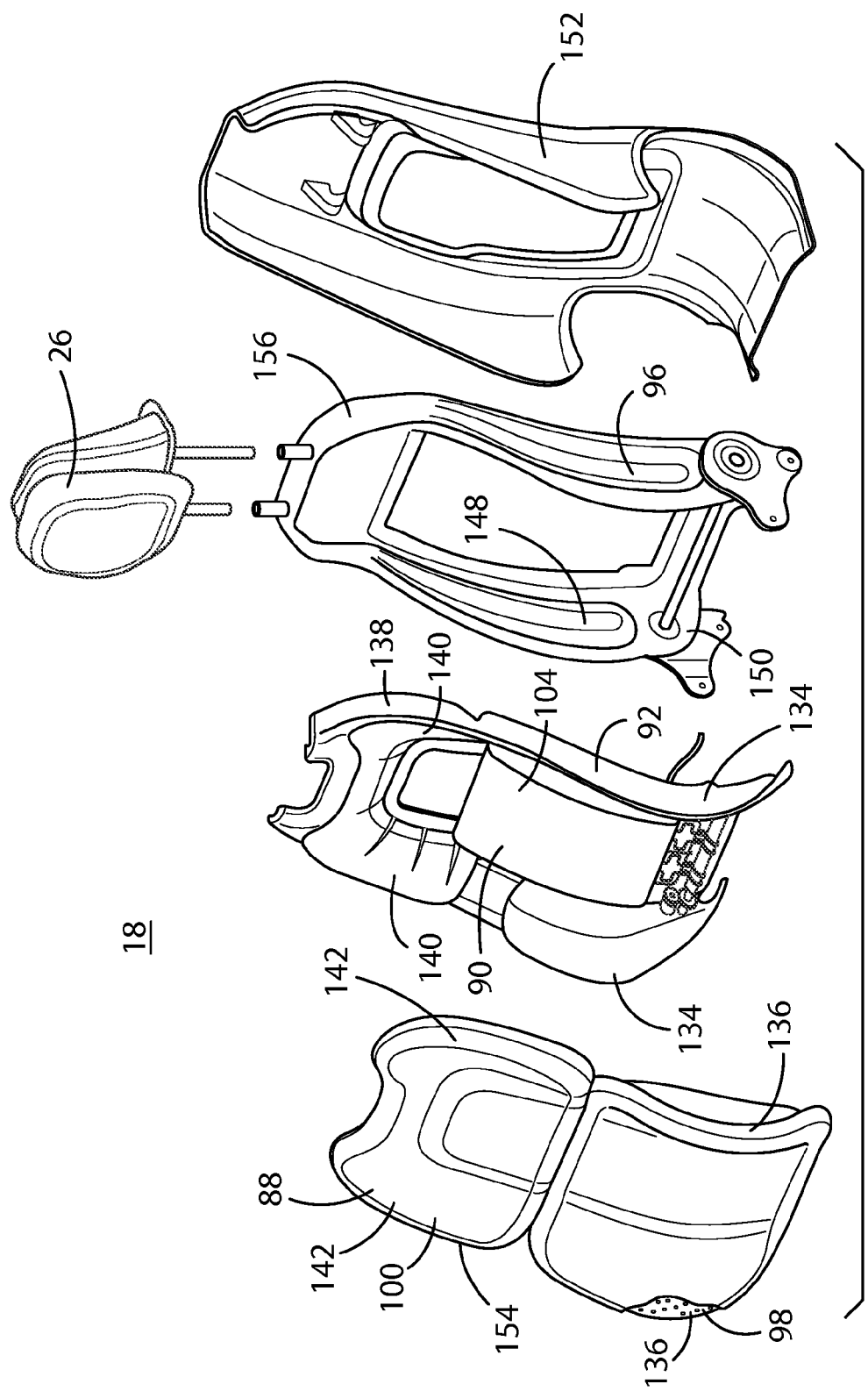

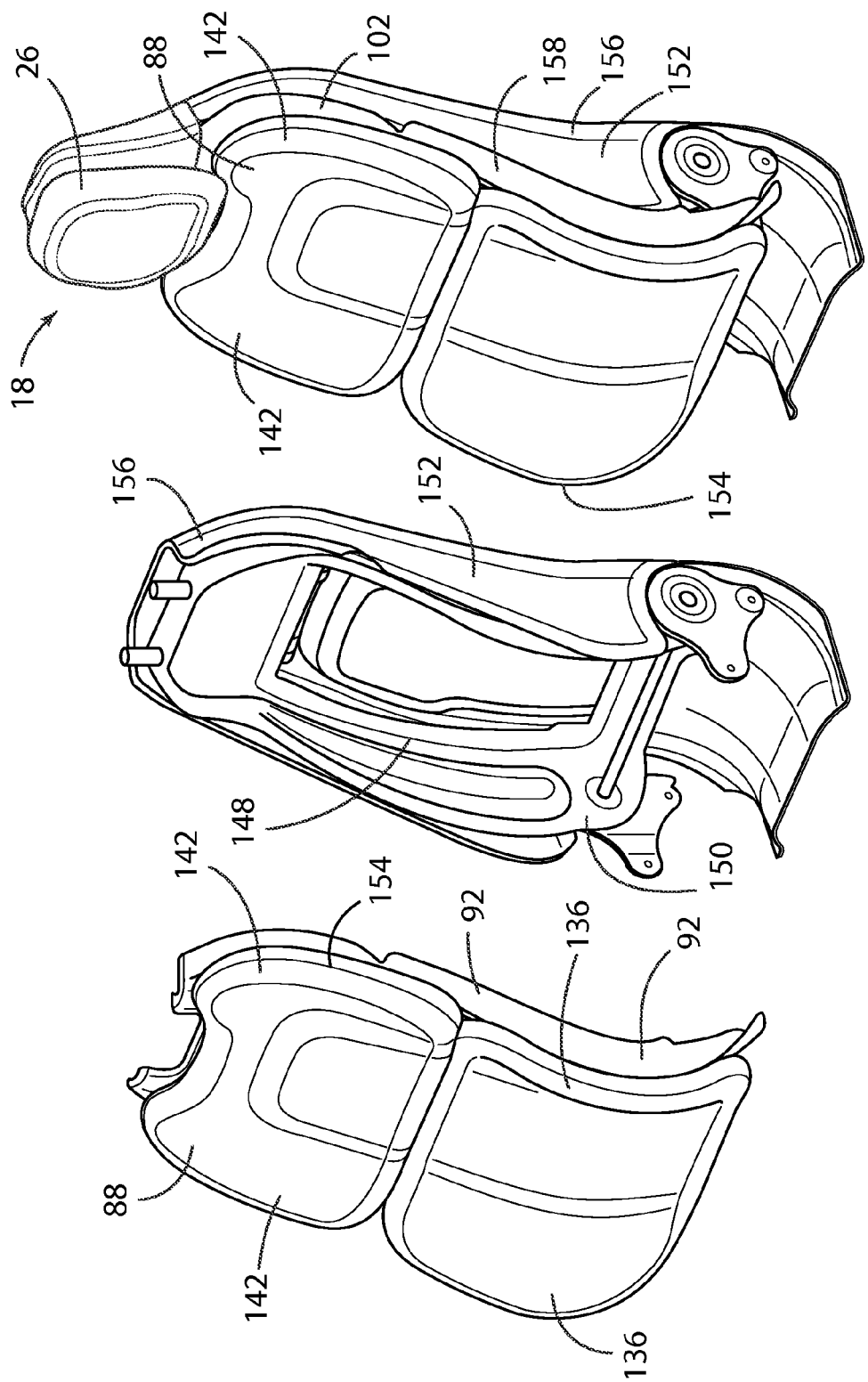

US 9,802,521 B2

MULTILAYER SEAT

FIELD OF THE INVENTION

The present invention generally relates to a vehicle seat, and more particularly to a multilayered vehicle seat having inflatable air bladders for adjusting the firmness of a seat cushion and seatback.

BACKGROUND OF THE INVENTION

Vehicle seating assemblies typically include a horizontal seating support and a generally upright seatback. Traditionally, the horizontal seating support includes a thick foam member which is covered in leather or fabric. The thick foam member is then usually mounted to a seat frame and held in place by the leather or fabric cover. However, the foam that is typically used on such horizontal seating supports tends to be rather rigid and does not have very much flexibility as a user moves relative the horizontal seating structure, particularly during extended vehicle trips. Such seating assemblies are also typically plain and usually visually unappealing. Accordingly, there is a need to have a vehicle seating assembly that is flexible in nature yet provides adequate support to a user for extended periods of time when travelling, yet is easy to assemble and aesthetically pleasing.

SUMMARY OF THE INVENTION

One aspect of the present invention includes a vehicle seating assembly having a lower seating structure and a raised seatback support for supporting an occupant. One of either the lower seating structure or raised seatback support consists of a multilayer assembly comprising a flexible static layer, a flexible dynamic layer having an adjustable firmness, a suspension layer formed from tunable springs which support a flexible panel, and a frame supported carrier within which the suspension layer is cradled.

Another aspect of the present invention includes a vehicle seating assembly comprising a multilayer assembly further comprising a suspension layer having tunable springs, a flexible panel supported by the suspension layer, a bladder assembly disposed upon the flexible panel, a thin foam layer disposed above the bladder assembly, and a frame supported carrier within which the suspension layer is cradled.

Yet another aspect of the present invention includes a method of assembling a vehicle seating assembly for a motor vehicle having a lower seating structure and a raised seatback support, wherein one of either the lower seating structure or raised seatback support consists of a multilayer assembly, the method comprising the steps of attaching a flexible static layer over a flexible dynamic layer having an adjustable firmness, attaching a suspension layer formed from tunable springs which support a flexible panel to the flexible dynamic layer, attaching an interior trim panel to a seat frame, and attaching the seat frame to the suspension layer such that the suspension layer is cradled within a protective recess of the seat frame to create a cradling effect for a user occupying the vehicle seating assembly. In the case where the raised seatback support consists of the multilayer assembly, the raised seatback support includes a first periphery about the flexible static layer and a second periphery about the frame supported carrier. An external peripheral gap is defined between the first and the second peripheries.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 4 is a top perspective exploded view of the lower seating structure according to the present disclosure;

FIG. 5 is a top perspective view of the frame supported carrier, the suspension layer, and the flexible dynamic layer of the lower seating structure of vehicle seat assembly according to the present disclosure;

FIG. 6 is a top perspective view of the frame supported carrier and the suspension layer cradled within the lower seating structure of the vehicle seat assembly according to the present disclosure;

FIG. 7 is a top perspective view of the assembled lower seating structure according to the present disclosure;

FIG. 8 is a top perspective exploded view of the raised seatback support according to the present disclosure;

FIG. 10 is a top perspective view of the assembled flexible static layer and flexible dynamic layer having an adjustable firmness of the raised seatback support of the vehicle seat assembly according to the present disclosure;

FIG. 11 is a top perspective view of the frame supported carrier and clam shell shaped-shaped back panel module of the raised seatback support of the vehicle seat assembly according to the present disclosure; and FIG. 12 is a top perspective view of the assembled raised seatback support according to the present disclosure.

DETAILED DESCRIPTION OF THE PREFERRED EMBODIMENTS

Figure 1:
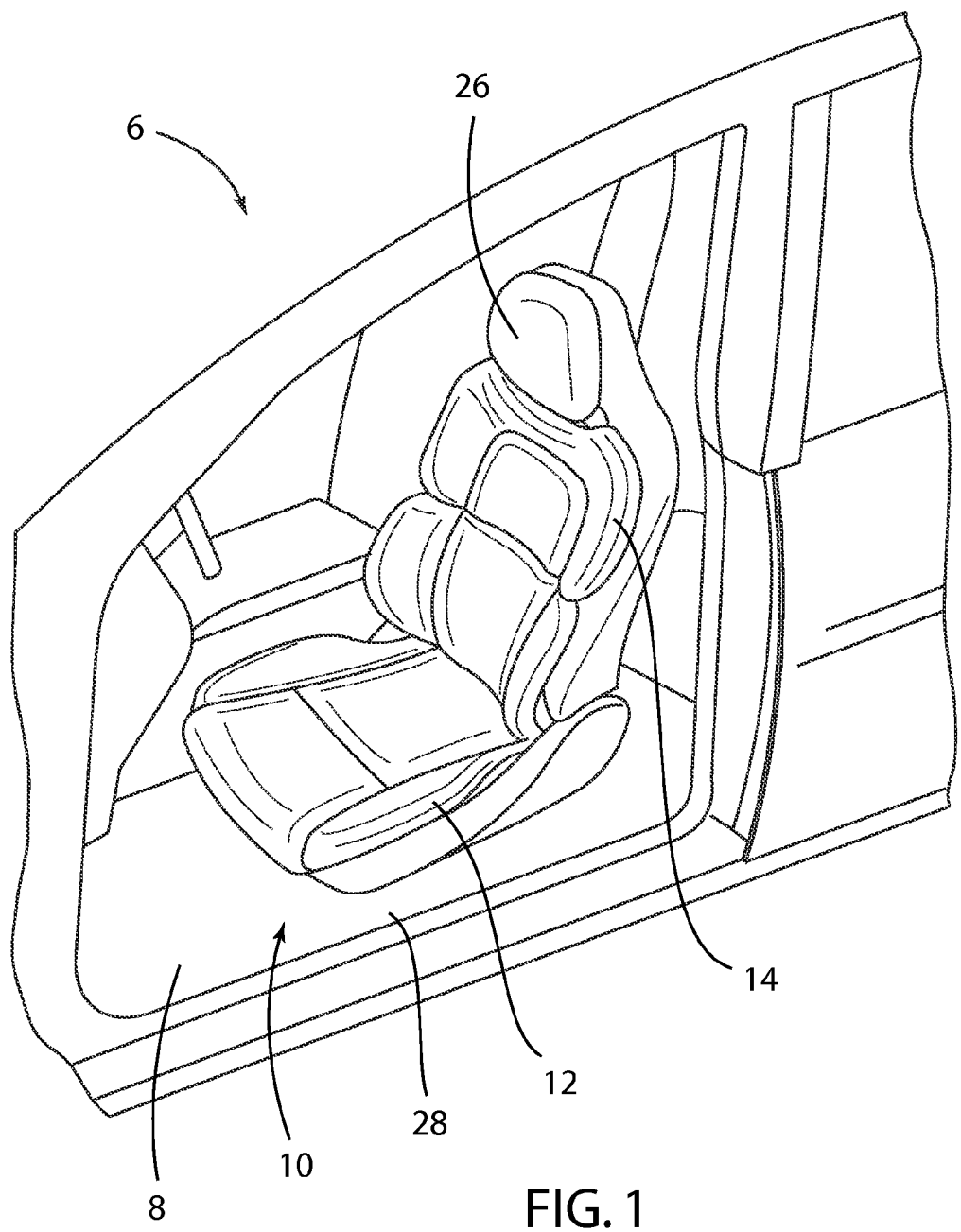
FIG. 1 is a top perspective view of a vehicle seat assembly disposed inside a vehicle.

For purposes of description herein, the terms "upper," "lower," "right," "left," "rear," "front," "vertical," "horizontal," "interior," "exterior," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
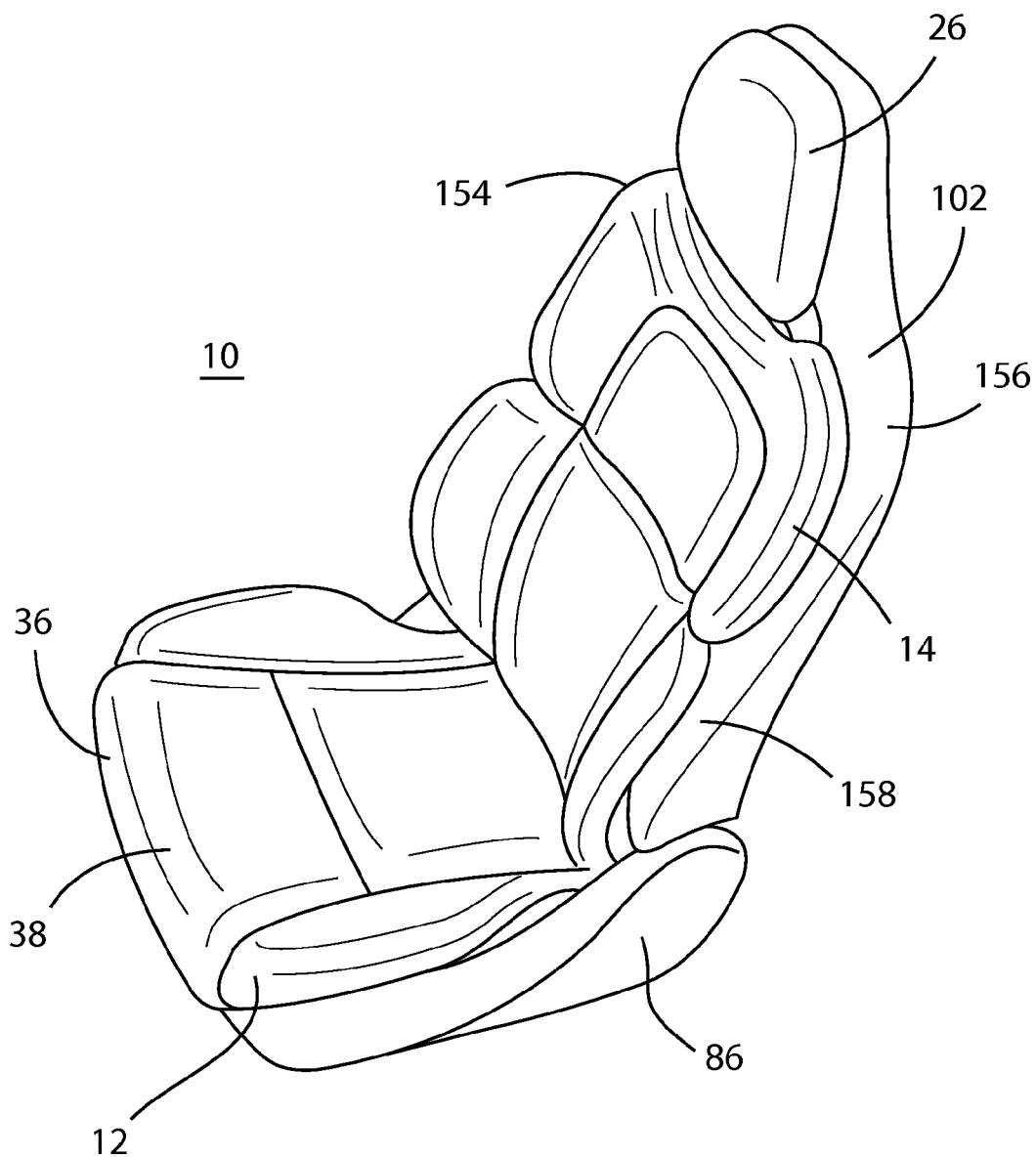
FIG. 2 is a top perspective view of the vehicle seat assembly according to the present disclosure.
Figure 3:
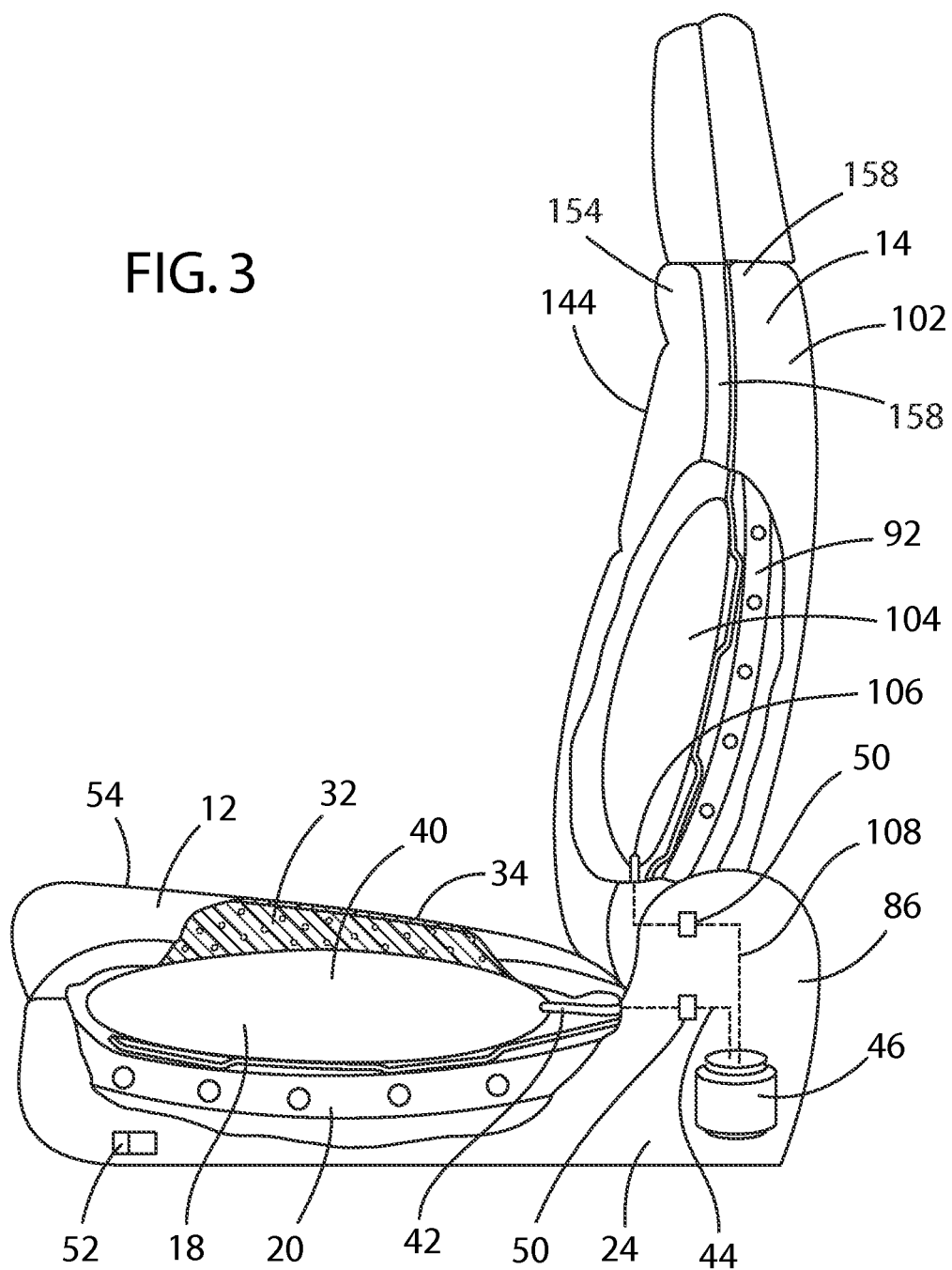
FIG. 3 is a side elevational view of the vehicle seat of FIG. 2 with portions of the seat cut-away to illustrate the components within the vehicle seat.
Figure 9:
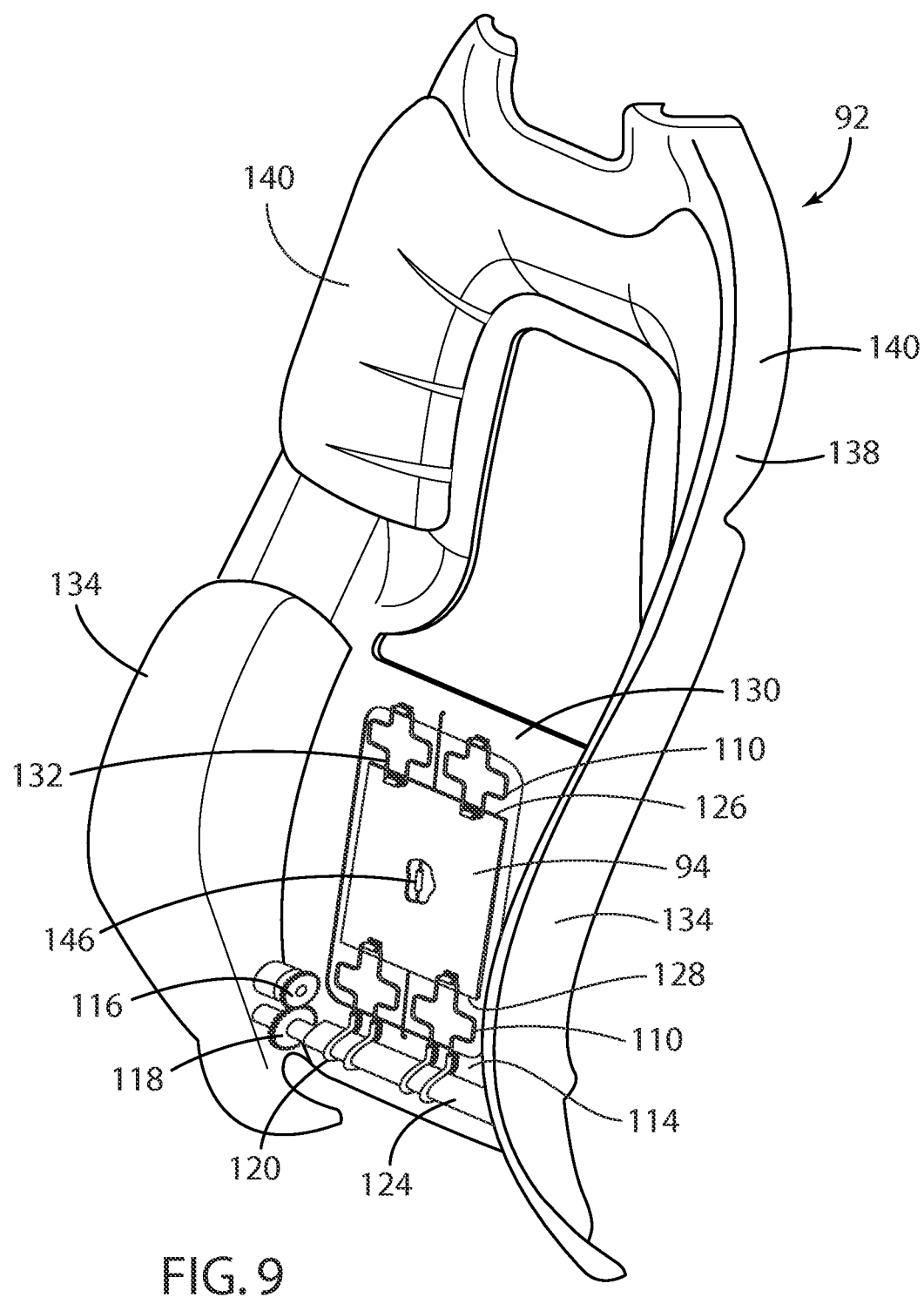
FIG. 9 is a top perspective view of the suspension layer of the raised seatback support of the vehicle seat assembly according to the present disclosure.

Referring to FIGS. 1-3, reference numeral 10 generally designates a vehicle seating assembly for use in a vehicle cabin 8 of an automotive vehicle 6. The vehicle seating assembly 10 includes a lower seating structure 12 pivotably coupled to a raised seatback support 14. As described herein below, preferably each of the lower seating structure 12 and raised seatback support 14 are comprised of a flexible static layer 16, a flexible dynamic layer 18 having an adjustable firmness, a suspension layer 20 formed from tunable springs which support a flexible panel 22, and a frame supported carrier 24 within which the suspension layer 20 is cradled.

As shown in FIG. 1, the vehicle seating assembly 10 is generally configured for use in a variety of vehicles 6 in a front driver seat, a front passenger seat, or a rear seat of the vehicle 6 and generally includes the aforementioned lower seating structure 12 and raised seatback support 14. A head restraint 26 is also mounted to the top of the raised seatback support 14. The vehicle seating assembly 10 may be configured to be mounted on a support surface, such as a floor pan 28 of the vehicle 6. A seat track assembly 30 may be coupled to the lower seating structure 12 to facilitate fore and aft positioning of the vehicle seating assembly 10, as is known. The vehicle seating assembly 10 is generally designed for the comfort of an occupant, as well as to accommodate and protect the occupant during a collision event.

Referring now to FIG. 4, the lower seating structure 12, the firmness of which is configured to be selectively adjustable, is configured to support the occupant's buttocks and upper thighs and includes the flexible static layer 16, the flexible dynamic layer 18, the suspension layer 20 supporting the flexible panel 22, and the frame supported carrier 24 within which the suspension layer 20 is cradled.

The flexible static layer 16 is preferably a thin foam layer 32 covered by a flexible trim cover 34 of a woven or nonwoven fabric, vinyl, or leather. The thin foam layer 32 and trim cover 34 provide the primary interface between the vehicle seating assembly 10 and the user. The trim cover 34 envelopes the lower seating structure 12 and thus is intended to cover the lower seating structure 12 in an aesthetically pleasing manner. The flexible static layer 16 can also be provided optionally with articulable and movable thigh supports 36, 38 that can be extended fore and aft, as well as up and down, to provide adjustable support for the thighs of the motor vehicle occupant.

The flexible dynamic layer 18, disposed just below and juxtaposed with the flexible static layer 16, includes, in part, an inflatable bladder 40 for selectively adjusting the firmness of the flexible dynamic layer 18. The inflatable bladder 40 is thus enclosed within the trim cover 34 and is arranged in a substantially stacked relationship with the flexible static layer 16, where it is positioned below the trim cover 34 with respect to the floor pan 28 of the vehicle 6. The inflatable bladder 40 may be made of a deformable elastomeric material, such as thermoplastic polyurethane, but can also be made from other suitable deformable material as is commonly known in the art.

The inflatable bladder 40 is provided with an inlet 42, which is fluidly coupled to a line or hose 44 and a pump 46 for inflating and deflating the inflatable bladder 40. Additionally, the inflatable bladder 40 may be operably coupled to a pump controller 48, multiple control valves 50, and a switch 52 for selectively activating the pump 46. The switch 52 may be a multi-position switch and can be mounted in a convenient and reachable location, such as a seat side shield or an instrument panel, so the occupant can control the inflation and deflation of the inflatable bladder. Additionally, the switch 52 may be capacitive and included in the vehicle software, and may be accessible through a touch screen included in the instrument panel or other location. The pump 46 is a conventional pump and pumps either ambient air or a fluid through the valves 50 and hose 44 to the inflatable bladder 40. When activated, the pump 46 inflates the inflatable bladder 40 between a first firmness level and a second firmness level, the first firmness level having a firmness higher than the second firmness level, which consequently adjusts the overall firmness of the multilayer vehicle seating assembly 10. The flexible dynamic layer 18 thus provides an expandable layer that contours and cushions the user.

Although not shown, the inflatable bladder 40 may also include exhaust ports, which, when activated by the switch 52, are opened to deflate the inflatable bladder 40. Further, it is within the scope of the present disclosure to use any suitable inflation system to inflate and deflate the inflatable bladder 40. It should be noted that the terms "inflation" and "deflation" are used interchangeably herein with the phrases "increase in pressure" and "decrease in pressure."

The firmness of the lower seating structure 12 can thus be adjusted by increasing or decreasing the pressure within the inflatable bladder 40. In one embodiment, the inflatable bladder 40 is an air bladder and the inflation system uses air to inflate/deflate the inflatable bladder. As is easily understood, increasing the air pressure within the inflatable bladder 40 increases the firmness of the lower seating structure 12, and decreasing the air pressure within the inflatable bladder 40 decreases the firmness of the lower seating structure 12. As the inflatable bladder 40 is inflated, it expands upward, thereby raising, in terms of height relative to the vehicle floor pan 28, a seating surface 54 of the lower seating structure 12. The opposite is true for decreasing the firmness of the lower seating structure 12.

The suspension layer 20 is disposed beneath and juxtaposed with the flexible dynamic layer 18 and is formed from tunable springs 56 which support the flexible panel 22. In one embodiment, at least one variable tension spring 56 is mounted to a frame 58. The suspension layer 20 may also include a motor 60, a gear 62, and a spring attachment member 64. A fixedly mounted connecting rod 66 extends between lateral sides of the lower seating structure 12 and a sleeve 68 rotatably encircles the connecting rod 66. The motor 60 and gear 62 are operably coupled to the sleeve 68 and the spring attachment member 64 is rigidly mounted on the sleeve 68. The variable tension springs 56 are mounted in tension between the spring attachment member 64, a front and rear end 70, 72 of the flexible panel 22, and a forward portion 74 of the lower seat frame 58. When activated, the motor 60 and gear 62 are adapted to rotate the sleeve 68 and spring attachment member 64. In the illustrated example, rotating the sleeve 68 and spring attachment member 64 rearward raises a rear portion 76 of the variable tension springs 56 and increases the tension applied to the variable tension springs 56 and the flexible panel 22. Raising the rear portion 76 of the variable tension springs 56 raises the height of the seating surface 54. Additionally, as is understood by one of ordinary skill in the art, increasing the tension on the variable tension springs 56 decreases the flex or extension thereof, which means the springs 56, flexible panel 22, and adjacent inflatable bladder 40 will move downward a smaller distance when placed under load, such as when an occupant sits on the seat. Conversely, rotating the sleeve 68 and spring attachment member 64 forward lowers the rear portion 76 of the variable tension springs 56 and decreases the tension applied to the variable tension springs 56 and the flexible panel 22. This increases the flex or extension of the variable tension springs 56, which means the springs 56, flexible panel 22, and adjacent inflatable bladder 40 will move downward a greater distance when an occupant is seated in vehicle seating assembly 10. Further, lowering the rear portion 76 of the variable tension springs 56 lowers the height of the seating surface 54.

In operation, and as illustrated in FIG. 4, the height and tension of the variable tension springs 56 can be adjusted to counteract or augment a change in the height of the seating surface 54 caused by a selective increase or decrease in the pressure within the inflatable bladder 40. Deflating the inflatable bladder 40 decreases the height of the inflatable bladder 40, and therefore lowers the seating surface 54. However, the decrease in height of the inflatable bladder 40 can be compensated for by raising the rear portion 76 of the variable tension springs 56 and increasing the tension on the springs 56, effectively raising the height of the inflatable bladder 40 when an occupant is seated on the seat 20. This enables the occupant to select a softer seating support, yet maintain the overall height of the seating surface 54. Conversely, the decrease in height of the inflatable bladder 40 can be augmented by lowering the rear portion 76 of the variable tension springs 56 and decreasing the tension on the springs 56, effectively lowering the height of the inflatable bladder 40 when an occupant is seated on the seat 20. This enables the occupant to select an even softer seating support, although at an overall lower height of the seating surface 54.

As is easily understood, the opposite is true with respect to increasing the firmness of the lower seating structure 12. Referring to FIG. 8, when increasing the firmness of the lower seating structure 12, the inflatable bladder 40 is selectively inflated, and the height and tension of the variable tensions springs 56 is reduced, effectively lowering the height of the inflatable bladder 40 when an occupant is seated upon the seat 20. Additionally, the vehicle seating assembly 10 may include a strain gauge 78 for measuring the tension in the variable tension springs 56, which may be used for automatically controlling the motor 60 and applied tension.

The suspension layer 20 is cradled within a protective recess 80 provided on the frame supported carrier 24 to create a cradling effect for a user occupying the vehicle seating assembly 10. The frame supported carrier 24 is disposed beneath and is also juxtaposed with the suspension layer 20. The frame supported carrier 24 preferably comprises a rigid support frame 82 and a pair of laterally opposing trim panels 84, 86. The protective recess 80 of the frame supported carrier 24 is sized and shaped to accept within its volume the flexible dynamic layer 18 and the suspension layer 20 formed from tunable springs 56 which support the flexible panel 22, and is therefore shielded from view of the vehicle occupants. In contrast, the flexible static layer 16 is disposed outside of the protective recess 80 and is fully visible to view.

Thus, the vehicle seating assembly 10 of the present disclosure provides a vehicle seating assembly 10 having a lower seating structure 12 wherein the flexible dynamic layer 18, the suspension layer 20, and the flexible panel 22 supported by the suspension layer 20 are received within the protective recess 80 provided on the frame supported carrier 24, and the flexible static layer 16 is not received within the protective recess 80 of the frame supported carrier 24.

Additionally, the raised seatback support 14 configured to support the occupant's back is constructed in similar fashion to the lower seating structure 12, where the firmness of the raised seatback support 14 may be configured to be selectively adjustable. Referring to FIG. 8, the seatback includes a flexible static layer 88, a flexible dynamic layer 90, a suspension layer 92 supporting a flexible panel 94, and a frame supported carrier 96 within which the suspension layer 92 is cradled. The flexible static layer 88 is preferably also a thin foam layer 98 covered by a flexible trim cover 100 of a woven or nonwoven fabric, vinyl, or leather to provide the primary interface between the vehicle seating assembly 10 and the user. The trim cover 100 is coupled to the raised seatback support 14 and covers the raised seatback support 14 in an aesthetically pleasing manner, and preferably complements and is similar, if not identical, to the trim cover 34 on the lower seating structure 12. Head restraint 26 is coupled with the top portion 102 of the raised seatback support 14 and is substantially centered on the seatback.

The flexible dynamic layer 90 is disposed just aftward and juxtaposed with the flexible static layer 88, and includes, in part, an inflatable bladder 104 located in the lower lumbar area for selectively adjusting the firmness of the flexible dynamic layer 90. The inflatable bladder 104 is similarly enclosed within the trim cover 100. In one embodiment, the inflatable bladder 104 is similarly made of a deformable elastomeric material, such as thermoplastic polyurethane, but can also be made from other suitable deformable material as commonly know in the art.

The inflatable bladder 104 is also provided with an inlet 106, which is fluidly coupled to hose 108 and the pump 46 coupled with the lower seat structure 12 for inflating and deflating the inflatable bladder 104. Alternatively, a separate pump may be provided. Additionally, the inflatable bladder 104 may be operably coupled to the pump controller 48, multiple control valves 50, and switch 52 for selectively activating the pump 46. When activated, the pump 46 inflates the inflatable bladder 104 between a first firmness level and a second firmness level, the first firmness level having a firmness higher than the second firmness level, which consequently adjusts the overall firmness of the raised seatback support 14. The flexible dynamic layer 90 thus provides an expandable layer that contours and cushions the user. The inflatable bladder 104 may also include exhaust ports which may be opened to deflate the inflatable bladder.

The firmness of the raised seatback support 14 can thus be adjusted by increasing or decreasing the pressure within the inflatable bladder 104. In one embodiment, the inflatable bladder 104 is an air bladder, and the inflation system uses air to inflate/deflate the inflatable bladder 104. As is easily understood, increasing the air pressure within the inflatable bladder 104 increases the firmness of the raised seatback support 14, and decreasing the air pressure within the inflatable bladder 104 decreases the firmness of the raised seatback support 14. As the inflatable bladder 104 is inflated, it expands forward. The opposite is true for decreasing the firmness.

The suspension layer 92 is disposed aftward and juxtaposed with the flexible dynamic layer 90 and is likewise formed from tunable springs 110 which support a flexible panel 94. In one embodiment, at least one variable tension spring 110 is mounted to a spring frame 114. The suspension layer 92, like that in the lower seating structure 12, may also include a motor 116, a gear 118, and a spring attachment member 120. A fixedly mounted connecting rod 122 extends between lateral sides of the vehicle seating assembly 10, and a sleeve 124 rotatably encircles the connecting rod 122. The motor 116 and gear 118 are operably coupled to the sleeve 124, and the spring attachment member 120 is rigidly mounted on the sleeve 124. The variable tension springs 110 are mounted in tension between the spring attachment member 120, an upper and lower end 126, 128 of the flexible panel 94, and a middle portion 130 of the spring frame 114. When activated, the motor 116 and gear 118 are adapted to rotate the sleeve 124 and spring attachment member 120. Rotating the sleeve 124 and spring attachment member 120 in a first direction moves a lower portion 132 of the variable tension springs 110 downward and increases the tension applied to the variable tension springs 110 and the flexible panel 94. Additionally, increasing the tension on the variable tension springs 110 decreases the flex or extension thereof, which means the springs 110, flexible panel 94, and adjacent inflatable bladder 104 will move rearward a smaller distance when placed under load, such as when an occupant leans rearward against the raised seatback support 14. Conversely, rotating the sleeve 124 and spring attachment member 120 in the opposite direction moves the lower portion 132 of the variable tension springs 110 upward and decreases the tension applied to the variable tension springs 110 and the flexible panel 94. This increases the flex or extension of the variable tension springs 110, which means the springs 110, flexible panel 94, and adjacent inflatable bladder 104 will move rearward a greater distance when an occupant leans back in the vehicle seating assembly 10.

The suspension layer 92 also includes a lateral lower flex member 134 extending from each side of the spring frame 114 to engage a lower portion 136 of the flexible static layer 88. The lower portion 136 is positioned adjacent to a lower seat structure 12 and configured to support a lower back of an occupant. Similarly, an upper portion 138 of the suspension layer 92 has a pair of lateral flex members 140 extending to engage an upper portion 142 of the flexible static layer 88.

In operation, and as illustrated in FIG. 4, the height and tension of the variable tension springs 110 can be adjusted to counteract or augment a change in location of the vertical seating surface 144 caused by a selective increase or decrease in the pressure within the inflatable bladder 104. Deflating the inflatable bladder 104 decreases the forward extension of the inflatable bladder 104. However, the decrease in forward extension of the inflatable bladder 104 can be compensated for by increasing the tension on the springs 110, effectively moving the inflatable bladder 104 forward when an occupant is seated on the vehicle seating assembly 10. This enables the occupant to select a softer raised seatback support 14, yet maintain the rear and aft position of the vertical seating surface 144. Conversely, the decrease in inflation of the inflatable bladder 104 can be augmented by lowering the lower portion 132 of the variable tension springs 110 and decreasing the tension on the springs 110, effectively moving the inflatable bladder 104 rearward when an occupant is seated on the vehicle seating assembly 10. This enables the occupant to select an even softer raised seatback support 14.

As is easily understood, the opposite is true with respect to increasing the firmness of the raised seatback support 14. When increasing the firmness of the raised seatback support 14, the inflatable bladder 104 is selectively inflated, and the tension of the variable tension springs 110 is reduced, effectively moving the inflatable bladder 104 rearwardly when an occupant is seated upon the vehicle seating assembly 10. Additionally, the raised seatback support 14 may include a strain gauge 146 for measuring the tension in the variable tension springs 110, which may be used for automatically controlling the motor 116 and applied tension.

The suspension layer 92 is likewise cradled within a protective recess 148 provided on the frame supported carrier 96 to create a cradling effect for a user occupying the vehicle seating assembly 10. The frame supported carrier 96 is disposed rearward of and is also juxtaposed with the suspension layer 92. The frame supported carrier 96 preferably comprises a rigid support frame 150 and a clam shell shaped back panel module 152. As with the lower seating structure 12, the protective recess 148 of the frame supported carrier 96 is sized and shaped to accept within its volume the flexible dynamic layer 90 and the suspension layer 92, and is therefore shielded from view of the vehicle occupants. In contrast, the flexible static layer 88 is disposed outside of the protective recess 148 and is fully visible to view.

As a further feature of the disclosed raised seatback support 14 consisting of the multilayer assembly discussed above, the raised seatback support 14 includes a first periphery 154 about the flexible static layer 16 and a second periphery 156 about the frame supported carrier 96. An external peripheral gap 158 is defined between the first periphery 154 and the second periphery 156. By creating the aforementioned gap 158, the lower lateral flex members 134 and the upper lateral flex members 140 may be displaced rearward relative the frame supported carrier 96 without interference from any of the flexible dynamic layer 18, the suspension layer 20 and the frame supported carrier, thus allowing the occupant to move in the seat and allow the lower lateral flex members 134 and the upper flex members 140 to accommodate such movement. Overall, the effect is a more comfortable raised seating support 14, particularly for driving long distances.

Thus, the vehicle seating assembly 10 of the present disclosure provides an assembly wherein the flexible dynamic layers 18, 90, the suspension layers 20, 92, and the flexible panels 22, 94 supported by the suspension layers 20, 92 are received within the protective recesses 80, 148 provided on the frame supported carriers 24, 96, and the flexible static layers 16, 88 are not received within the protective recesses 80, 148 of the frame supported carriers 24, 96. Preferably, the trim panels 84, 86 and the clam-shell shaped back panel module 152 are colored in contrasting color to the trim covers 34, 100 of the flexible static layers 16, 88 for an aesthetically pleasing effect.

In another embodiment, the above described inflatable bladders 40, 104 are liquid bladders and the inflation system uses liquid to inflate/deflate the inflatable bladders 40, 104. Additionally, the inflatable bladders 40, 104 may each be made up of a plurality of bladders. It is contemplated that the plurality of bladders that make up each of the inflatable bladders 40, 104 can be fluidly communicative via additional lines or hoses. Further, the inflatable bladders 40, 104 can be fluidly connected to one another by hoses 44. Control valves 50 can be utilized to allow the air or fluid to flow freely through all the connected inflatable bladders 40, 104 when an occupant is seated in the vehicle seating assembly 10, allowing the inflatable bladders 40, 104 to equalize in pressure and firmness. After this initial equalization, the occupant may selectively adjust the firmness, and the pump controller 48 will inflate or deflate the inflatable bladders 40, 104, accordingly. It is also contemplated that a pressure sensor or one of the inflatable bladders 40, 104 may be used to sense the presence of a seated occupant, as is generally understood by one having skill in the art.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

We claim:

1. A vehicle seating assembly for a motor vehicle having a lower seating structure and a raised seatback support, wherein one of either the lower seating structure or the raised seatback support consists of a multilayer assembly comprising:
a flexible static layer;
a flexible dynamic layer having an adjustable firmness comprising an inflatable bladder;
a suspension layer disposed beneath and juxtaposed with the flexible dynamic layer, the suspension layer comprising a frame having a first end and an opposed second end, a single uniform continuous flexible panel having a first end and an opposed second end, a first set of tunable springs disposed between the first end of the frame and the first end of the continuous flexible panel, a second set of tunable springs disposed between the second end of the single uniform continuous flexible panel and a spring attachment member operably coupled with the second end of the frame, and a rotatable sleeve operably coupled with the spring attachment member, wherein the single uniform continuous flexible panel is supported between the first set of tunable springs and the second set of the tunable springs and tension applied to the single uniform continuous flexible panel and the first set and second set of tunable springs is adjusted by rotation of the rotatable sleeve; and
a frame supported carrier within which the suspension layer is cradled.

2. The vehicle seating assembly of claim 1, wherein the flexible static layer is a thin foam layer.

3. The vehicle seating assembly of claim 2, wherein the thin foam layer is covered by a flexible covering.

4. The vehicle seating assembly of claim 3, wherein the flexible covering comprises any of a woven or nonwoven fabric, vinyl or leather.

5. The vehicle seating assembly of claim 2, wherein the thin foam layer provides an interface between the vehicle seating assembly and a user.

6. The vehicle seating assembly of claim 1 further comprising a user control comprising a motor operably coupled with the rotating sleeve of the suspension layer and operational to move the suspension layer between a first tension and a second tension, and a user control operably coupled to the flexible dynamic layer and operational to move the flexible dynamic layer between a first firmness level and a second firmness level by a pump, the first firmness level having a firmness higher than the second firmness level, which consequently adjusts the firmness of the multilayer seating assembly.

7. The vehicle seating assembly of claim 1, wherein the flexible dynamic layer provides an expandable layer that contours and cushions a user.

8. The vehicle seating assembly of claim 1, wherein the frame supported carrier comprises a rigid support frame and a pair of laterally opposing interior trim panels.

9. The vehicle seating assembly of claim 1, wherein both of the lower seating structure and the raised seatback support comprise a multilayer assembly comprising:
a flexible static layer;
a flexible dynamic layer having an adjustable firmness;
a suspension layer comprising a first and second set of tunable springs which support a single uniform continuous flexible panel at first and second ends of the continuous flexible panel, respectively; and
a frame supported carrier within which the suspension layer is cradled.

10. A vehicle seating assembly comprising a multilayer assembly further comprising a suspension layer having tunable springs, a single uniform continuous flexible panel supported by the tunable springs of the suspension layer, an inflatable bladder disposed above and juxtaposed with the single uniform continuous flexible panel, a thin foam layer disposed above and juxtaposed with the inflatable bladder, and a frame supported carrier within which the suspension layer is cradled, wherein the suspension layer comprises a frame having a first end and an opposed second end, the single uniform continuous flexible panel having a first end and an opposed second end, a first set of tunable springs disposed between the first end of the frame and the first end of the single uniform continuous flexible panel, a second set of tunable springs disposed between the second end of the single uniform continuous flexible panel and a spring attachment member operably coupled with the second end of the frame, and a rotatable sleeve operably coupled with the spring attachment member and wherein the single uniform continuous flexible panel is supported between the first set of tunable springs and the second set of the tunable springs and tension applied to the continuous flexible panel and the first set and second set of tunable springs is adjusted by rotation of the rotatable sleeve.

11. The vehicle seating assembly of claim 10, wherein the suspension layer is located in the lower seating structure and a lower lumbar area of the raised seatback support.

12. The vehicle seating assembly of claim 10, wherein the inflatable bladder is operable between inflated and deflated conditions by a pump and the vehicle seating assembly further comprises a control operably coupled to the pump.

13. The vehicle seating assembly of claim 10, wherein the suspension layer is cradled within a protective recess provided on the frame supported carrier to create a cradling effect for a user occupying the vehicle seating assembly.

14. The vehicle seating assembly of claim 13, wherein the suspension layer and the single uniform continuous flexible panel supported by the suspension layer is received within the protective recess provided on the frame supported carrier and the thin foam layer and the inflatable bladder are not received within the protective recess of the frame supported carrier.

15. The vehicle seating assembly of claim 14, wherein the thin foam layer and the inflatable bladder not received with the protective recess of the frame supported carrier form a first layer upon which the user is supported in the vehicle seat assembly and the single uniform continuous flexible panel supported by the suspension layer is received within the protective recess provided on the frame supported carrier form a second layer.

16. The vehicle seating assembly of claim 14, wherein the frame supported carrier is located in the raised seatback support and comprises a rigid support frame and a clam shell shaped back panel module, and wherein the raised seatback support includes a first periphery about the flexible static layer and a second periphery about the frame supported carrier to form an external peripheral gap between the first and the second periphery.

17. The vehicle seating assembly of claim 10, wherein the frame supported carrier is located in the lower seating structure and comprises a rigid support frame and a pair of laterally opposed interior trim panels.

18. A method of assembling a vehicle seating assembly for a motor vehicle having a lower seating structure and a raised seatback support, wherein one of either the lower seating structure or the raised seatback support consists of a multilayer assembly, the method comprising the steps of:
   attaching a flexible static layer over a flexible dynamic layer comprising an inflatable bladder having an adjustable firmness;
   attaching a suspension layer formed from tunable springs which support a single uniform continuous flexible panel to the flexible dynamic layer, wherein the suspension layer comprises a frame having a first end and an opposed second end, the single uniform continuous flexible panel having a first end and an opposed second end, a first set of tunable springs disposed between the first end of the frame and the first end of the single uniform continuous flexible panel, and a second set of tunable springs disposed between the second end of the single uniform continuous flexible panel and a spring attachment member operably coupled with the second end of the frame, and a rotatable sleeve operably coupled with the spring attachment member, and wherein the the single uniform continuous flexible panel is supported between the first set of tunable springs and the second set of the tunable springs and rotating the rotatable sleeve to adjust tension applied to the single uniform continuous flexible panel and the first set and second set of tunable springs;
   attaching an interior trim panel to a seat frame; and
   attaching the seat frame to the suspension layer such that the suspension layer is cradled within a protective recess of the seat frame to create a cradling effect for a user occupying the vehicle seating assembly.

19. The method of claim 18 where both of the lower seating structure and the raised seatback support comprise a multilayer assembly comprising:
   a flexible static layer;
   a flexible dynamic layer having an adjustable firmness;
   a suspension layer comprising a first and second set of tunable springs which support a single uniform continuous flexible panel at a first and second end of the single uniform continuous flexible panel, respectively; and
   a carrier upon which the flexible static layer, the flexible dynamic layer, and the suspension layer are supported.

* * * * *